United States Patent Office.

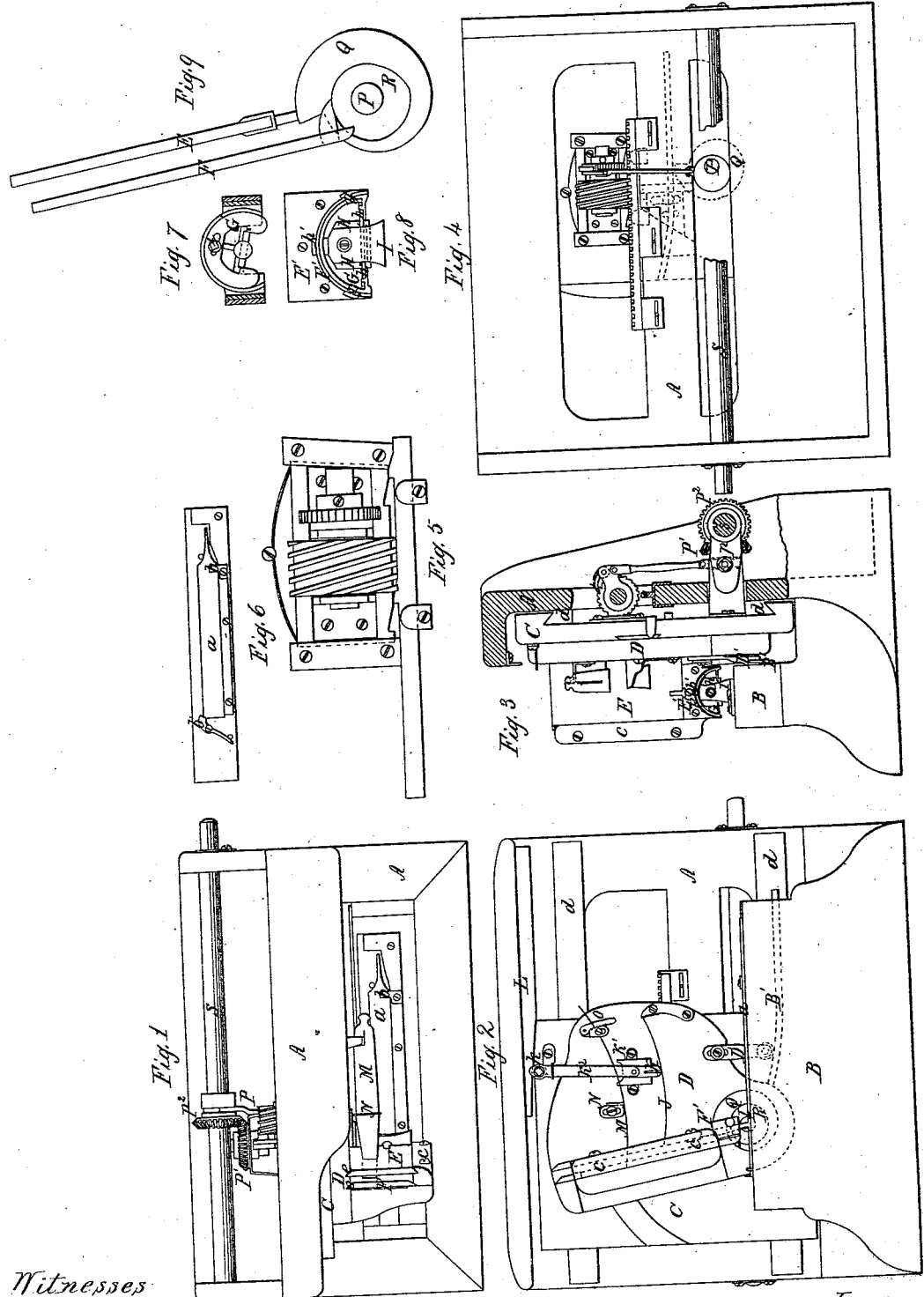

ELISHA O. POTTER, OF PAWTUCKET, RHODE ISLAND, ASSIGNOR TO C. A. WARLAND AND J. M. RYDER, OF SAME PLACE.

Letters Patent No. 64,396, dated April 30, 1867.

---

IMPROVED MACHINE FOR CUTTING FILES.

---

The Schedule referred to in these Letters Patent and making part of the same.

---

TO ALL WHOM IT MAY CONCERN:

Be it known that I, ELISHA O. POTTER, of Pawtucket, in the county of Providence, and State of Rhode Island, have invented certain new and useful improvements in Machines for Cutting Files; and I do hereby declare that the following is a full, clear, and exact description of the same, taken in connection with the accompanying drawings, making part of this specification, in which—

Figure 1 represents a plan of my improved machine.

Figure 2 is a front elevation.

Figure 3 is an end elevation, partly in section, but not all in the same plane.

Figure 4 is an elevation of the back side; and

Figures 5, 6, 7, 8, and 9 represent detached parts of the machine that will be referred to in the description.

The first part of my invention relates to the manner of constructing and arranging the devices which hold the chisel in machines where the chisel is separate from the hammer by which the blow is struck to cut the tooth in the file, and consists in arranging the chisel-holder in a block, the exterior of which, upon its upper side, is made circular, and rests in a semicircular recess in the lower part of the chisel-slide or device which holds the block, the radius of the circle being such that its centre is at or near the centre of the edge of the chisel when it rests upon the file, and the plane of its oscillation is transverse to the axis of the file; and it is so guided in the recess as to be free to rock laterally to enable the edge of the chisel to adapt itself to the surface of the file, by which means the lateral rocking or tipping of the chisel does not displace it laterally upon the file or require the edge of the chisel to slip upon its surface.

The second part of my invention relates to the manner of arranging the devices in a machine where the cutting apparatus is so constructed as to vary the inclination of the chisel to the bed, in a vertical plane, during the operation of cutting the file, and consists in arranging the former or shaper, by which the inclination is controlled on the bed and below the frame which carries the cutting apparatus, and upon which the cutter-frame directly rests, so that the weight of the parts, co-operating with the spring which forces the hammer downward, holds the frame firmly upon a solid rest, and prevents the vibration of the parts when the blow is struck to cut the tooth.

The drawings represent a machine similar in its general arrangement to that shown in the patent granted to Charles A. Warland and myself November 8, 1864, No. 44,998, with my improvements applied thereto. A represents the framing of the machine, and B the fixed bed or anvil on which the file-blank $a$ rests while being cut, being secured thereon by suitable fastenings $b\ b'$, as seen in fig. 6. C is the carriage which carries the cutting apparatus, and moves horizontally upon the guides $d\ d$ attached to the frame A to carry the cutter from one end of the file to the other. This carriage carries upon the face next to the bed a secondary carriage or frame, D, to which the operative parts of the cutting apparatus are attached, as shown. The cutter-frame D is made to oscillate in the plane of the movement of the carriage about the cam-shaft P as a centre, being connected with the carriage C by a suitable central bearing around the shaft and the circular dove-tail slide $c$. E is the hammer or ram that strikes the blow to cut the tooth, which slides up and down in suitable guides $e\ e$ upon the frame D, as shown. F is the cutter-slide, which is arranged parallel to the ram and immediately behind it, and also works up and down in the guides $e$. To the lower end of the cutter-slide is attached the circular socket F', in which the semicircular block G works, which carries the chisel-holder H. This socket projects in front of the slide F, as shown, so as to bring the chisel-holder directly under the hammer E in the proper position to receive its blow. The radius of the circle of the socket is such that its centre is at the middle of the edge of the chisel when it rests upon the file-blank. The block G is held in its circular bearing by suitable guides $g\ g$, which will permit it to move or rock laterally, so that when the chisel I is pressed down upon the blank it will adapt itself thereto with freedom. H is the chisel-holder, which carries the chisel I and works in guides $h\ h\ h'$ in the block G, and has a small movement up and down in the block, a little more than the depth of the cut of the chisel in the blank, which movement is limited by suitable stops. The lower guides $h\ h$ are made in a segmental piece, G', which is secured to the block G by the bolt $i$, as is seen in fig. 7. The upper guide $h'$ of the chisel-holder is made round, and fits in a bearing in the top of the block G, and also projects upward through an opening in the circular socket a sufficient distance to receive the blow of the hammer properly. By means of this arrangement of the guides the chisel can be set to work diagonally across the file-blank, at any desired angle, as may be seen in fig. 7, without changing its relation to the hammer. The hammer is raised by the cam Q on the driving-shaft P, and is forced downward to increase the blow by the leaf-spring J, arranged as shown in fig. 2, the tension of which is regulated by the movable fulcrum K, which works in a guide, $K^1$, on the cutter-frame, and is held in a suitable position by means of the former or shaper L, attached to the frame of the machine, through the intervention of the rod $K^2$ and roller $k$, that works on the lower face of the shaper. The roller $k$ has its stud adjustable in the rod $K^2$ to adjust the tension of the spring J as may be required. The mode of operation of this part of the mechanism is similar to that in common use so far as relates to the adjustment of the tension of the spring. The chisel-slide F is worked by the cam R on the shaft P, which raises and lowers it at the proper time to raise the chisel off from the blank, when it is fed along to cut the next tooth, and lower it again upon the blank before the hammer falls upon it. The arrangement of the cams and the parts they operate is shown in fig. 9. When the chisel I is let down upon the blank by the cam R it is held firmly in contact with the blank by the leaf-spring M, which is held by the fixed fulcrum N and the adjustable fulcrum O, as shown, by which means the tension of the spring can be adjusted. To the lower part of the cutter-frame D is attached an adjustable standard, D', as shown, the lower end of which carries a roller or other suitable bearing surface, which rests upon the former B', which is firmly attached to the bed B. The shape of the upper surface of the former B' is made such that as the standard D' passes over it as the carriage C is moved along it will be raised or lowered, and thus tip the cutter-frame D sufficiently to give the change of the inclination of the chisel to the bed that may be desired In the former, B' is placed below the cutter-frame and forms, in effect, a part of the bed. That part of the cutter-frame which rests upon it has a steady and firm support, and is held thereon firmly both by its gravity and the action of the spring J, as is obvious from an inspection of the drawings, thus avoiding the possibility of any jarring or movement in a vertical direction that would interfere with the proper cutting of the file. The shaft P, which covers the cams Q and R, works in a long bearing on the carriage C, which extends back through an opening in the framing of the machine, as shown, and upon its back end carries the bevel-gear $P^1$, which engages with another bevel-gear, $P^2$, which slides upon and revolves with the horizontal shaft S. The gears are kept in engagement by the bracket $p$, which is attached to the carriage and embraces the sleeve of the gear $P^2$, as is shown. The power to drive the machine is applied to the shaft S, and by means of the gears described is communicated to the operative parts in an obvious manner. The mechanism by which the carriage C is fed along to carry the chisel over the length of the file is shown in figs. 3, 4, and 5, and is in construction and operation substantially like that shown in the aforesaid Patent No. 44,998, and, as it forms no part of the improvements now claimed, need not be further described.

Although the improvements herein set forth are represented as applied to a file-cutting machine in which the bed is stationary and the cutting apparatus is carried over it to cut the file, yet they are equally applicable in a machine where the cutting apparatus is stationary and the bed immovable, and I intend so to apply them; and both or either of them may also be substantially applied to machines having other peculiarities of construction and produce the same beneficial results.

What I claim as my invention, and desire to secure by Letters Patent, is—

1. Combining the chisel-holder, or device which holds the chisel, with the chisel-slide or other device by which the chisel is raised and lowered to and from the file-blank by means of a circular bearing or socket, the centre or axis of which is at or near the centre of the edge of the chisel, and the plane of its oscillation is transverse to the file, substantially as described.

2. The manner in which I have combined and arranged the former or shaper which controls the inclination of the chisel to the bed, with reference to the bed and to a cutter-frame made to oscillate in a vertical plane parallel to the length of the file to vary said inclination, by attaching the former or shaper to the bed and below the cutter-frame, and causing the cutter-frame to rest directly upon it for support, substantially as described.

Executed at Boston this 19th day of October, 1866.

ELISHA O. POTTER.

Witnesses:
WM. C. HIBBARD,
N. C. LOMBARD.